United States Patent [19]

Murata et al.

[11] Patent Number: 5,185,388

[45] Date of Patent: Feb. 9, 1993

[54] EPOXY RESIN ELECTRICAL ENCAPSULATION COMPOSITION

[76] Inventors: Yasuyuki Murata, 4-5-54-101 Ogoso; Isako Konishi, 4-5-2-6 Ogoso; Ryohei Tanaka, 4-5-56-301 Ogoso, all of Yokkaichi City, Mei Prefecture; Yoshinori Nakanishi, 6-4-30 Higashiasahigaoka, Suzuka City, Mie Prefecture, all of Japan

[21] Appl. No.: 884,247

[22] Filed: May 11, 1992

Related U.S. Application Data

[63] Continuation of Ser. No. 660,387, Feb. 25, 1991, abandoned.

[30] Foreign Application Priority Data

Feb. 23, 1990 [JP] Japan .................................. 2-41221

[51] Int. Cl.$^5$ ...................... C08L 63/04; C08L 61/16; C08L 61/14; C08G 8/36
[52] U.S. Cl. .................................. 523/466; 525/481; 525/482; 528/98
[58] Field of Search ................. 523/466; 525/481, 482; 528/98

[56] References Cited

U.S. PATENT DOCUMENTS 4,390,664 6/1983 Kanayama .......................... 525/507
4,394,496 7/1983 Schrader ............................. 528/98

Primary Examiner—John C. Bleutge
Assistant Examiner—D. R. Wilson

[57] ABSTRACT

An electrical encapsulation composition is disclosed comprising (a) an epoxy resin which is the product of glycidating a polyphenolic compound which is the condensation product of (i) a substituted phenol which can be represented by the formula

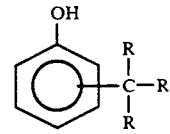

in which each R is selected independently from hydrogen, $C_{1-5}$ alkyl and phenyl, with the provisos that at least two R groups are not hydrogen and that the R groups may be bonded in a ring structure, and (ii) an aromatic aldehyde or aromatic ketone having a phenolic hydroxyl group as represented by the general formula

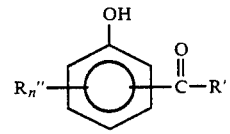

in which R' is selected from hydrogen, $C_{1-5}$ alkyl and phenyl, R" is selected from $C_{1-5}$ alkyl, phenyl, methoxy and halogen, and n is an integer from 0 to 4; (b) a curing agent for the epoxy resin; and (c) an inorganic filler.

9 Claims, No Drawings

EPOXY RESIN ELECTRICAL ENCAPSULATION COMPOSITION

This is a continuation of application Ser. No. 660,387, filed Feb. 25, 1991, now abandoned.

BACKGROUND OF THE INVENTION

This invention relates to epoxy resin-based electrical encapsulation compositions.

Epoxy resins are used to encapsulate electrical components such as integrated circuits. The optimum properties for encapsulation resins include high glass transition temperature in the cured state, good crack resistance under soldering and low water adsorption.

Recent developments in the use and packaging of semiconductive elements include surface mounting of such elements. In the surface mounting process, the semiconductive device is immersed in a bath of molten solder and exposed to high temperature. Under these conditions, any moisture in the encapsulating material will expand and cause the encapsulating material to crack.

The currently most widely used epoxy-based encapsulating formulation contains an o-cresol novolac epoxy resin. Such resins have high hydroscopicity (tendency to adsorb water) and poor crack resistance during soldering. Epoxy resins which are derived from the condensation product of phenols and hydroxy benzaldehydes exhibit good thermal stability but tend to have high hydroscopicity and to crack under soldering.

It is therefore an object of the invention to provide an epoxy-based electrical encapsulation formulation which has good thermal stability, low hygroscopicity and good crack resistance under soldering.

BRIEF SUMMARY OF THE INVENTION

According to the invention, an electrical encapsulation composition is provided comprising (a) an epoxy resin which is the product of glycidating a polyphenolic compound which is the condensation product of (i) a substituted phenol which can be represented by the formula

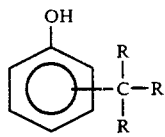

in which each R is selected independently from hydrogen, $C_{1-5}$ alkyl and phenyl, with the provisos that at least two R groups are not hydrogen and that the R groups may be bonded in a ring structure, and (ii) an aromatic aldehyde or aromatic ketone having a phenolic hydroxyl group as represented by the general formula

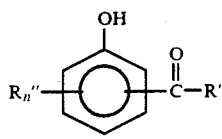

in which R' is selected from hydrogen, $C_{1-5}$ alkyl and phenyl, R" is selected from $C_{1-5}$ alkyl, phenyl, methoxy and halogen, and n is an integer from 0 to 4; (b) a curing agent for the epoxy resin; and (c) an inorganic filler.

DETAILED DESCRIPTION OF THE INVENTION

The epoxy resin component of the invention encapsulation formulation is a polyglycidyl ether of a defined class of polyphenolic compounds. Such polyphenolic compounds are the condensation reaction products of a phenolic compound and an aldehyde or ketone. The phenolic compounds can be represented by the formula

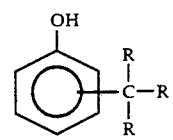

in which each R is selected independently from hydrogen, $C_{1-5}$ alkyl and phenyl, with the provisos that at least two R groups are not hydrogen and that the R groups may be bonded in a ring structure. The aromatic aldehydes and aromatic ketones have a phenolic hydroxyl group and can be represented by the formula

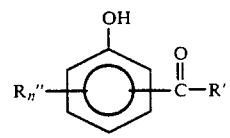

in which R' is selected from hydrogen, $C_{1-5}$ alkyl and phenyl, and R" is selected from $C_{1-5}$ alkyl, phenyl, methoxy and halide, and n is an integer from 0 to 4. Such phenols include, for example, isopropyl phenol, secbutylphenol, tert-butylphenol, tert-amylphenol, cyclohexylphenol, cumylphenol and mixtures of these. The phenols employed as starting materials for the polyepoxy resins used in the invention encapsulation formulations may include other phenols outside the scope of the above formula, such as phenol, cresol, xylenol, hydroquinone and bisphenol-A, for example, so long as the defined substituted phenols are present in an amount of at least 20% by weight, preferably 40% by weight, in order to maintain the thermal and hydroscopic properties imparted to the encapsulation formulations by the defined substituted phenols.

Examples of suitable aldehydes and ketones having a phenolic hydroxyl group include hydroxybenzaldehyde, methylhydroxybenzaldehyde, methoxyhydroxybenzaldehyde, hydroxyacetophenone, hydroxyphenylethyl ketone, and the like.

The condensation reaction between the defined phenols and the defined aldehydes or ketones is carried out by contacting about 0.1 to about 3.0 moles, preferably about 0.2 to about 1.0 mole, of the aromatic aldehyde or aromatic ketone with each mole of the phenol in the presence of an acidic catalyst at a temperature in the range of about 40° to about 200° C. over a time of about 1 to about 12 hours. Suitable acidic catalysts include mineral acids such as hydrochloric acid and sulfuric acid, organic acids such as oxalic acid and toluene sulfonic acid, and organic acid salts. The catalyst is generally employed in an amount of about 0.1 to about 5 parts by weight per 100 parts by weight of the phenol.

The polyepoxide of the invention composition is prepared by contacting the polyphenol with an excess of epichlorohydrin in the presence of an alkali metal hydroxide such as NaOH or KOH at a temperature within the range of about 80° to about 105° C. (for atmospheric pressure reaction) or from about 50° to about 80° C. (for reduced pressure reaction). Optional catalysts such as quaternary ammonium salts, tertiary amines, imidazoles, phosphonium salts and phosphines may be employed. The reaction can be carried out in the presence of an inert solvent, including alcohols such as ethanol and isopropanol; ketones such as acetone and methylethyl ketone; ethers such as dioxane, ethylene glycol dimethylether; and non-protonated polar solvents such as dimethylsulfoxide and dimethylformamide.

The epoxy resin component of the invention encapsulation compound includes at least 50% by weight of the above-described polyepoxide, with the remainder optionally a second epoxy resin or blend of resins. Other types of epoxy resins which can optionally be included are those obtained by glycidating various polyphenols such as those derived from the condensation reaction of a phenol, such as bisphenol-A, bisphenol-F, resorcinol, hydroquinone, methylresorcine, phenol novolac, cresol novolac, resorcinol novolac, bisphenol-A novolac, and the like, with an aldehyde such as hydroxybenzaldehyde, crontonaldehyde, glyoxal and the like.

To prepare the invention encapsulation formulations, the above-described polyepoxy resin is combined, suitably by melt-mixing, with a curing agent, a filler and any optional components such as curing accelerators, mold release agents, fire retardants, pigments and coupling agents. Many curing agents are known in the art. Preferred curing agents for the present encapsulation formulations are phenolic novolacs and cresol novolacs. Suitable cure accelerators include imidazoles such as 2-methylimidazole and 2-ethyl-4-methylimidazole, amines such as 2,4,6-tris(dimethylaminomethyl)phenol and benzyldimethylamine, and organophosphorus compounds such as tributylphosphine and triphenylphosphine. Suitable fillers for encapsulation formulations include fused silica, crystalline silica, glass powder, alumina, zircon and the like. The resulting blend is then cooled to a solid and ground to a molding powder for encapsulation application.

EXAMPLE 1

This example describes the preparation of various polyphenols. Into a four-neck, 5-L flask equipped with a thermometer, stirrer and cooler were charged a phenol and an aromatic aldehyde in the amounts indicated in Table 1, along with 8.5 g of p-toluene sulfonic acid. The reaction was allowed to proceed at 120° C. for five hours. Then, under reduced pressure of 50–80 mmHg, the condensation reaction was carried out with continuous removal of water and phenols. When the by-product water reached an amount of 123 g, the pressure was further lowered to 0.5 to 1 mmHg and excess phenols were completely removed at a temperature of 150° to 160° C. for two hours. The polyphenol was a reddish-brown solid and had the softening point and hydroxyl equivalent weight shown in Table 1.

TABLE 1

| | Experiments | | | | |
|---|---|---|---|---|---|
| | 1 | 2 | 3 | 4 | 5 |
| Kind of materials and amount charged | | | | | |
| Phenols | o-iso-propyl-phenol (3264 g) | o-t-butyl-phenol (3600 g) | o-cumyl-phenol (2540 g) o-cresol (864 g) | phenol (3290 g) | o-n-butyl-phenol (3600 g) |
| Aromatic aldehydes | Salicyl-aldehyde (732 g) | Salicyl-aldehyde (732 g) | p-hydroxy-benzalde-hyde (488 g) | Salicyl-aldehyde (854 g) | Salicyl-aldehyde (732 g) |
| Polyphenol Produced | | | | | |
| Softening point (°C.) | 102 | 111 | 115 | 118 | 103 |
| Hydroxyl group equivalent (g/eq.) | 127 | 136 | 148 | 99 | 137 |

EXAMPLE 2

This example illustrates the preparation of polyglycidyl ethers from the polyphenolic compounds prepared in Example 1. Into three-necked 5-L flasks equipped with a stirrer, thermometer and cooler were respectively charged the indicated amounts of the polyphenols prepared in Example 1. Epichlorohydrin (2775 g) and 1080 g isopropyl alcohol were added. The resulting solutions were heated to 35° C., and 544 g of an aqueous solution of sodium hydroxide were added dropwise over about 1 hour while the reaction temperature was allowed to rise gradually to 65° C. at the completion of the dropwise addition. The reaction product was washed with water to remove by-product salts and excess sodium hydroxide. Excess epichlorohydrin and isopropyl alcohol were evaporated under reduced pressure. The crude epoxy product was dissolved in 1200 g of methylisobutyl ketone, 15.0 g of aqueous sodium hydroxide were added, and the reaction mixture was maintained at 65° C. for one hour. Sodium primary phosphate was then added to the reaction system to neutralize excess sodium hydroxide, and the product was washed for removal of by-product salts. Solvents were removed by evaporation under reduced pressure. The resulting yellowish-red solids had the epoxy equivalents and softening points indicated in Table 2.

TABLE 2

| | Experiments | | | Comparative Experiments | |
|---|---|---|---|---|---|
| | 1 | 2 | 3 | 4 | 5 |
| Polyphenol (amoung charged) | (762 g) | (828 g) | (888 g) | (594 g) | (822 g) |
| Epoxy Compound | | | | | |

TABLE 2-continued

|  | Experiments | | | Comparative Experiments | |
|---|---|---|---|---|---|
|  | 1 | 2 | 3 | 4 | 5 |
| Epoxy equivalent (g/eq.) | 200 | 211 | 223 | 168 | 212 |
| Softening point (°C.) | 63 | 64 | 66 | 61 | 58 |

EXAMPLE 3

The epoxy compounds prepared in Example 2 as well as an ortho cresol novolac-type epoxy resin were used to prepare filled encapsulation formulations as shown in Table 3. Each formulation was melt-mixed in a mixing roll at a temperature in the range of 90°–110° C. for five minutes, and the resulting mixture was removed in the form of a sheet, cooled and crushed to provide powder molding material. Each of the materials was molded in a low-pressure transfer molding machine at a mold temperature of 180° C. and a molding time of 180 seconds, to form test pieces. After post-curing at 180° C. for eight hours, physical properties such as glass transition point, hydroscopicity and thermal resistance under soldering were determined on each of the molded products. Results are shown in Table 3.

TABLE 3

|  |  | Working Experiments | | | | Comparative Experiments | | |
|---|---|---|---|---|---|---|---|---|
|  |  |  |  |  | Ex. 2 (50) Cresol novolak-type epoxy resin (50) [1] |  |  | Cresol novolak-type epoxy resin (100) [1] |
| Epoxy compounds (amount formulated) |  | Ex. 1 (100) | Ex. 1 (100) | Ex. 3 (100) |  | Ex. 4 (100) | Ex. 5 (100) |  |
| Formulation Components (parts by weight) |  |  |  |  |  |  |  |  |
| Brominated epoxy resin | [2] | 10 | 10 | 10 | 10 | 10 | 10 | 10 |
| Phenol novolac resin | [3] | 54 | 51 | 49 | 52 | 64 | 51 | 54 |
| Triphenylphosphine |  | 1 | 1 | 1 | 1 | 1 | 1 | 1 |
| Silica powder | [4] | 383 | 376 | 371 | 378 | 406 | 376 | 383 |
| Antimony trioxide |  | 10 | 10 | 10 | 10 | 10 | 10 | 10 |
| Carnauba wax |  | 1 | 1 | 1 | 1 | 1 | 1 | 1 |
| Epoxy silane | [5] | 1 | 1 | 1 | 1 | 1 | 1 | 1 |
| Physical Properties of cured products |  |  |  |  |  |  |  |  |
| Glass transition temp. (°C.) | [6] | 188 | 185 | 181 | 177 | 196 | 161 | 163 |
| Hygroscopicity (%) | [7] | 0.80 | 0.76 | 0.73 | 0.82 | 1.20 | 0.79 | 0.91 |
| Thermal resistance under soldering | [8] | 0/16 | 0/16 | 0/16 | 1/16 | 12/16 | 10/16 | 13/16 |

Footnotes
[1] Epikote ® 180H65 having an epoxy equivalent of 201 and a softening point of 67° C., a product of Yuka Shell Epoxy K.K.
[2] Epikote ® 5050, having an epoxy equivalent of 385 and a bromine content of 49%, a product of Yuka Shell Epoxy K.K.
[3] Phenol novolak having a softening point of 85° C., a product of Gunei Chemical K.K.
[4] Tradename "RD-8", a product of Ryushinsha K.K.
[5] Tradename "KBM-403", a product of Shinetsu Chemical K.K.
[6] Determined by TMA from transition point in thermal expansion curve.
[7] Hygroscopicity at 121° C. and 100% RH after 200 hours.
[8] Determined from the number of cracks formed in sixteen pieces of flat plastic packages (44 pin FPP) exposed to moisture at 85° C. and 85% RH for 168 hours, followed by immersion in bath of molten solder at 260° C. for ten seconds.

We claim:
1. An electrical encapsulation composition comprising:
(a) a polyglycidyl ether of a polyhydric phenol which is the condensation reaction product of (i) a phenolic compound which can be represented by the formula

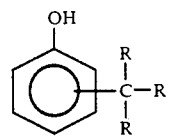

in which each R is selected independently from hydrogen, $C_{1-5}$ alkyl and phenyl and at least two R groups are not hydrogen and (ii) an aromatic aldehyde or aromatic ketone which can be represented by the formula

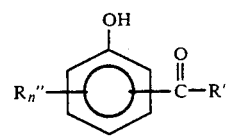

in which R' is selected from hydrogen, $C_{1-5}$ alkyl and phenyl, and R" is selected from $C_{1-5}$ alkyl, phenyl, methoxy and halide, and n is an integer from 0 to 4;
(b) a curing agent for the epoxy resin; and
(c) an inorganic filler.
2. The composition of claim 1 in which the inorganic filler is silica.
3. The composition of claim 1 in which the phenolic compound is selected from the group consisting of isopropyl phenol, sec-butyl phenol, tert-butyl phenol, tert-amyl phenol, cyclohexyl phenol and cumyl phenol.
4. The composition of claim 3 in which the aromatic aldehyde or ketone is selected from the group consisting of hydroxybenzaldehyde, methylhydroxybenzaldehyde, methoxyhydroxybenzaldehyde, hydroxyacetophenone and hydroxyphenyl ethyl ketone.

5. The composition of claim 3 in which the curing agent is a phenolic novolac.

6. The composition of claim 1 in which the phenolic compound is o-isopropyl phenol and the aldehyde is p-hydroxybenzaldehyde.

7. The composition of claim 1 in which the aldehyde is salicylaldehyde.

8. The composition of claim 1 in which the phenolic compound is selected from the group consisting of isopropyl phenol, tert-butyl phenol and cumyl phenol, the aromatic aldehyde or ketone is selected from the group consisting of p-hydroxybenzaldehyde and salicylaldehyde, and the filler comprises silica.

9. The composition of claim 8 in which the curing agent comprises a phenolic novolac.

* * * * *